June 30, 1936.  D. KUSKIN  2,045,861
WINDSHIELD WIPER AND MOTOR THEREFOR
Filed May 20, 1933  4 Sheets-Sheet 2

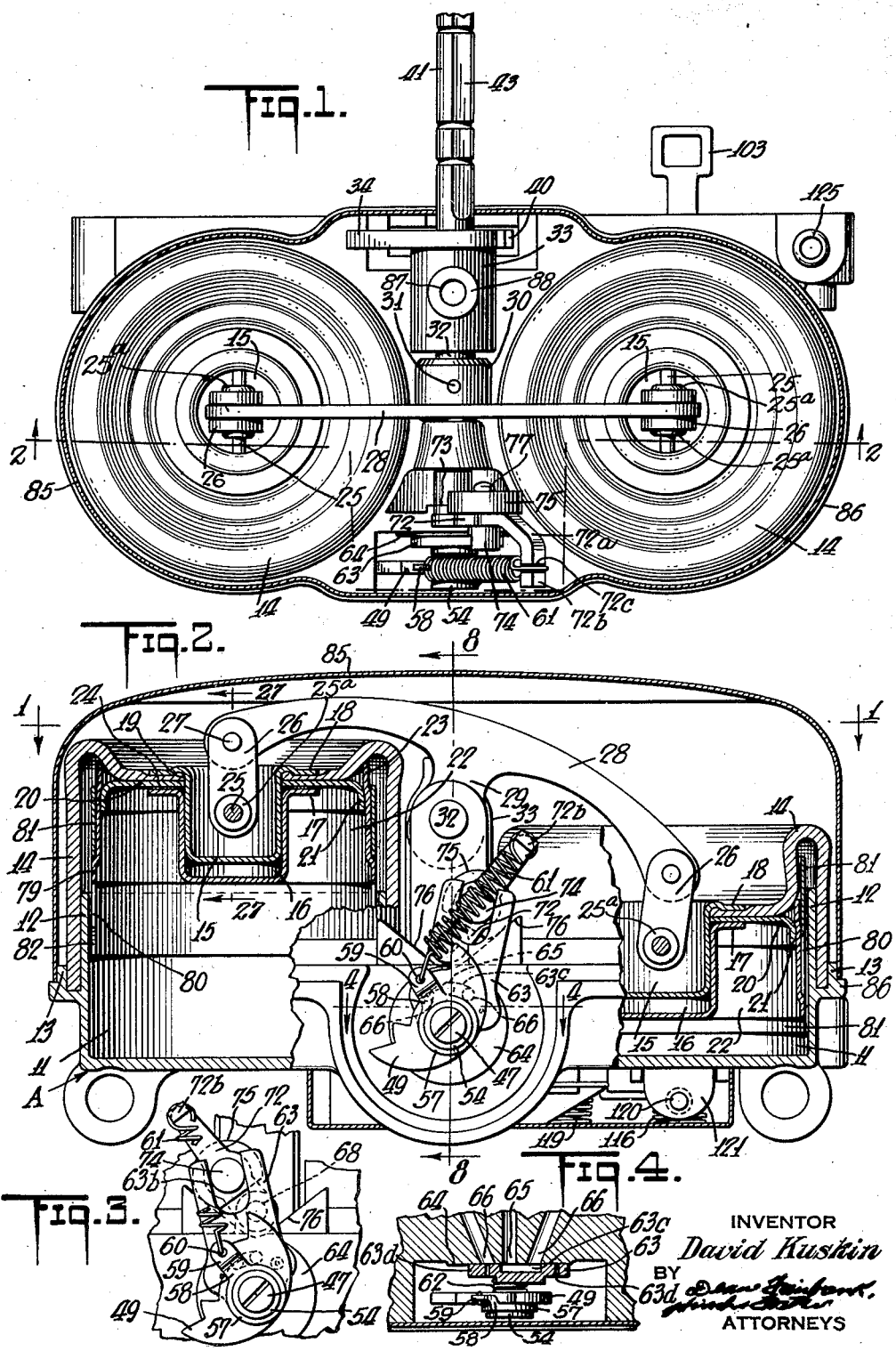

INVENTOR
David Kuskin
BY
ATTORNEYS

June 30, 1936.　　　　D. KUSKIN　　　　2,045,861
WINDSHIELD WIPER AND MOTOR THEREFOR
Filed May 20, 1933　　　　4 Sheets-Sheet 3
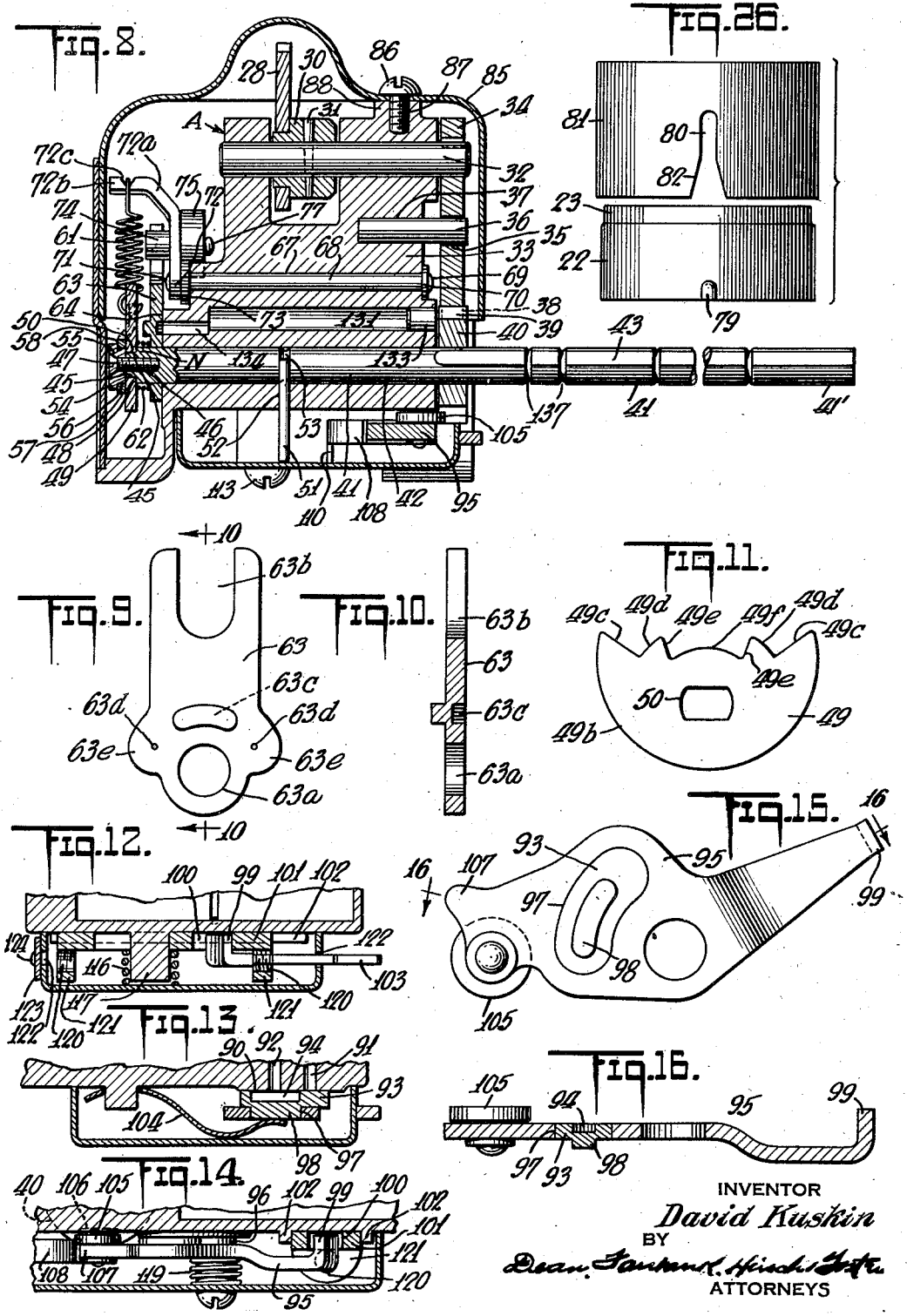

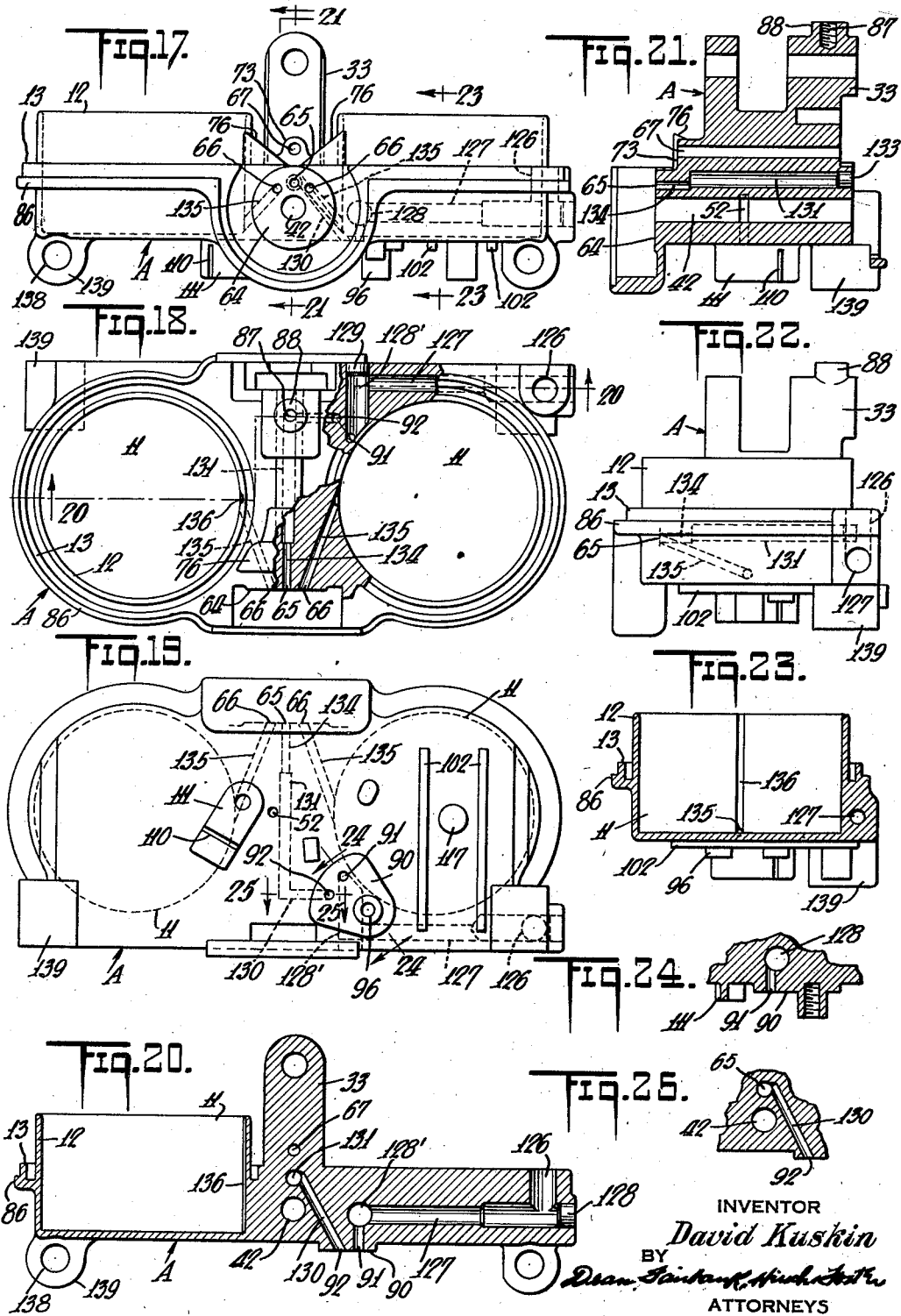

Patented June 30, 1936

2,045,861

UNITED STATES PATENT OFFICE 2,045,861

WINDSHIELD WIPER AND MOTOR THEREFOR

David Kuskin, New York, N. Y., assignor to Franklin J. Foster, New York, N. Y., trustee Application May 20, 1933, Serial No. 671,980

23 Claims. (Cl. 121—97)

The present invention considered from one aspect is concerned with a fluid pressure operated motor which may have a wide and varied range of usefulness, but which is peculiarly adapted and primarily intended for embodiment in a light duty suction motor of the type which may derive its power from the intake manifold of an internal combustion engine or from any other suction inducing means forming part of the standard equipment of a car. Considered from another aspect the invention is concerned with windshield wiper mechanism, particularly with a windshield wiper of the automatically operated type.

An object of the invention is to provide a light duty suction motor which is substantially frictionless in operation and more particularly, which is devoid of sliding or reciprocating parts capable of creating friction.

Another object is to provide a motor in which there is no danger of leakage or air into the working chambers, such chambers being preferably self-sealing against the entry of air and being characterized by the absence of any parts slidable or otherwise movable through the walls thereof.

Another object is to provide a small compact motor unit capable of developing a maximum amount of power per unit area of the differential pressure surface employed and capable of utilizing a small pressure differential between a source of vacuum and the atmosphere to deliver a substantial amount of power to the power take-off mechanism which is coupled to the wiper or other device to be operated.

Another object is to provide a motor construction which eliminates pistons and piston packings and equivalent actuating members and consequently avoids the necessity for lubricating such parts.

Another object is to provide a motor in which deformable flexible resilient members constitute distortable walls for the working chambers, such members opposing but slight resistance to flexure yet acting by their own inherent resiliency on each idle stroke to flex themselves into proper position for the next working stroke.

Another object is to provide light flexible resilient power applying elements of the character mentioned above which are nevertheless so designed that they will impose no needless load on the motor.

Another object is to provide a motor embodying a rugged yet simple system of moving parts for transmitting the power of and translating the motion of the flexible power applying elements to an oscillating drive shaft for the wiper, this motion translating mechanism being so arranged and mounted and interconnected with the shaft to be driven that it imposes no substantial load on the motor, all to the end that the power available for motor operation is translated to the oscillating wiper driving shaft with maximum efficiency.

Another object is to provide a simple, rugged, durable, practical, positive, fool-proof, snap valve mechanism controlling the alternate exhaust of air from and admission of air to the respective working chambers of the motor, such valve mechanism including but few parts and being devoid of the complexities which usually characterize such devices.

Another object is to so interlock the valve mechanism with part of the motion translating train and to actuate the mechanism with such positiveness that improper valve timing such as might cause premature or delayed valve action is effectively guarded against.

Another object is to provide a dual function primary valve mechanism for the motor which in the first place controls the connection of the snap valve with the source of suction and which in the second place predetermines the particular portion of the path of travel of the wiper arm at which the arm will come to rest when the motor stops. In other words an object of the invention is to provide a wiper parking and motor cut off mechanism which will automatically act to always cut off the motor with the wiper in parked position, out of the line of vision of the driver of the car.

Another object of the invention is to provide a parking mechanism which while fully automatic in its operation, will not rely upon fluid pressure to sustain the wiper in parked position, but will non-positively mechanically hold the wiper in such position so that a parked wiper arm may be shifted from one position to another by a garage attendant (who may for example be cleaning the windshield) without injury to the parking mechanism and which will automatically resume its parked position as soon as the motor of the car is started.

Another object of the invention is to provide a main parking and control valve arranged between the main suction line and the snap valve, yet so related to the motor that the number of bores necessary to connect the various valves and suction chambers etc. is reduced to a minimum and all of these bores are substantially straight and devoid of angles or sinuosities.

Another object is to provide a small compact motor assemblage, conveniently applicable adjacent the windshield of any car and which includes as its essential elements, a casting and a pair of flexible, resilient, power transmitting elements capable of ready assembly with respect to the casting.

From a manufacturing standpoint a single die casting member provides not only the stationary walls of the working chambers but suitable bearings for all of the moving parts of the motor, suitable mounting mechanism for the valves, suitable ports for interconnecting the valves with the work chambers and with the suction line, and suitable means for facilitating the attachment of the motor unit on or adjacent a windshield frame.

This casting requires but a negligible amount of machine work and greatly facilitates the expeditious assembly of the remainder of the motor mechanism even by unskilled operators.

Another object is to provide a motor unit of this character in which all of the parts subject to corrosion or wear due to an accumulation of dust or contact with moisture are wholly concealed and fully protected by the application of a pair of dust covers, neither of which appreciably increases the over-all size of the motor unit.

Another object is to provide a handle for the parking and control mechanism which may be conveniently removably attached from either side of the motor, eliminating the necessity for building special models of motor to accommodate inside or outside motor mountings.

Still another object is to provide a motor structure in which substantially all of the parts with the exception of the casting and the flexible resilient actuating members comprise stamped metal elements or standard securing devices or inexpensive springs to the end that the complete cost of assembly and manufacture will compare favorably with the cost of the more or less standard suction motors now in commercial use and which, due to their inherent construction are leaky, lose much of the available power due to the friction between moving parts, and deteriorate rapidly in the absence of frequent lubrication.

It may be noted in this connection that the necessity for lubricating such motor to avoid drying out of pistons is inevitably accompanied, especially in cold weather, by a further increased drag on the lubricated parts due to the high viscosity of the only lubricants which can be used.

The invention may be more fully understood from the following description in connection with the accompanying drawings wherein:—

Fig. 1 is a top plan view of a motor embodying my invention, this view being taken approximately on line 1—1 of Fig. 2, so that the main dust cover is shown in section, Fig. 2 is a view mainly in longitudinal section and partly in elevation, taken on the approximate line 2—2 of Fig. 1, this view showing the valve mechanism just about to trip, Fig. 3 is a fragmentary detailed elevation of the valve mechanism showing the position of the parts just after it has been tripped, Fig. 4 is a horizontal sectional view through the valve mechanism, taken on the line 4—4 of Fig. 2, Fig. 5 is a side elevational view showing the opposite side of the motor from that illustrated in Fig. 2 and with the top dust cover in section to expose parts, Fig. 6 is a bottom plan view of the motor with the lower dust cover removed and showing the motor shut off, Fig. 7 is a fragmentary view similar to Fig. 6 but showing the position of the parts after the control handle has been pulled out to release the wiper parking mechanism and permit operation of the motor, Fig. 8 is a vertical transverse sectional view approximately on the line 8—8 of Fig. 2, Fig. 9 is an elevational view of the snap valve, Fig. 10 is a vertical sectional view on the line 10—10 of Fig. 9, Fig. 11 is a front elevational view of the valve spring tripping member, Fig. 12 is a vertical sectional detail on the line 12—12 of Fig. 6, Fig. 13 is a similar view on the line 13—13 of Fig. 6, Fig. 14 is a similar view on the line 14—14 of Fig. 6, Fig. 15 is a plan view of the carrier lever for the parking valve and the parking roller, Fig. 16 is a longitudinal sectional view on the line 16—16 of Fig. 15, Figs. 17 to 25 inclusive are views of the casting member intended to illustrate the details of the casting itself and of the various ports and passageways which are cast integral therewith, Fig. 17 is a front elevational view of the casting, Fig. 18 is a top plan view thereof with parts broken away and in section for clearness, Fig. 19 is a bottom plan view thereof, Fig. 20 is a vertical sectional view on the line 20—20 of Fig. 18, Fig. 21 is a transverse section on the line 21—21 of Fig. 17, Fig. 22 is an end elevational view of the right hand end of the casting shown in Figs. 17 to 21, Fig. 23 is a transverse section on the line 23—23 of Fig. 17, Fig. 24 is a sectional detail on the line 24—24 of Fig. 19, Fig. 25 is a sectional detail on the line 25—25 of Fig. 19, Fig. 26 is a side elevational view of the two sleeves which control the collapse of the movable walls of the working chambers, and Fig. 27 is a sectional detail on the line 27—27 of Fig. 2.

In the drawings I have used the reference letter A to designate the base casting in its entirety. Figs. 17 to 23 are all views of this casting prior to assembling the remainder of the motor thereon. The casting is relatively flat and narrow and elongated, and includes adjacent each end a cylindrical socket member 11, these sockets being extended in the form of circular collars 12 projecting upwardly from the casting. The sockets are disposed in vertical parallel relationship and constitute the stationary portions of the working chambers. Each socket about midway of the height thereof is encircled by an integral trough 13 adapted to receive the mouth of a distortable inverted cup shaped rubber bag 14. When the working chambers are filled with air, these cups extend well above the upper ends of the collars 12 as will be evident from the left hand working chamber of Fig. 2.

The working chambers, cooperatively defined by the sockets 11 and the cups 14, have air exhausted therefrom and admitted thereto through means which I shall later describe. The resilient bags 14 constitute the collapsible walls of these working chambers and the differential pressure upon opposite sides of these walls caused by exhausting air from the interior of the chamber, supplies the necessary power for actuating the motor.

Means is provided for taking off power from the collapsible bags 14 and a special arrangement is utilized for so connecting the power take off means with the bags, that there can be no leakage of air at such connections. This means is illustratively shown as a pair of thimbles 15 and 16, each having flanged mouths 17 and 18. Openings are provided at 19 centrally of the top of each bag and thimble 15 which is of less depth than thimble 16 is tightly force-fitted into the latter in such a manner that the edges of the rubber bag encircling said opening 19 are firmly clamped between the flanges 17 and 18 of the thimbles.

Likewise, clamped between these flanges is a metallic plate 20, said plate being centrally apertured to receive the thimble 15 and including a downwardly turned flange 21 at its outer edge, force-fitted into a sleeve member 22 which is pendant from the flange 21 but the upper end 23 of which extends above the plate 20 for a purpose which will more fully hereinafter appear. If desired, leakage of air may be further safeguarded against by the interposition of a washer, typically a paper washer 24 between the lower face of the plate 20 and the thimble flange 17.

Before the two clamping thimbles have been force-fitted together, a cross pin 25 is preferably applied, through the inner thimbles above the bottom of the latter. Pin 25 carries a hub 25a upon which are mounted the lower ends of short rigid links 26. The upper ends of these links are pivotally connected as at 27 to a walking beam 28, said walking beam at its center having a pendant extension 29 rigidly fixed upon a hub member 30 which in turn is pinned as at 31 upon a rock shaft 32 (Fig. 8), said rock shaft being journalled in the bifurcated upper end of a boss or projection 33, integral with the casting and rising upwardly from the body of the casting between the two working chambers.

This boss 33, as will later be described, not only serves to mount the rock shaft 32 but to provide bearings for various other moving parts of the motor and mountings for various stationary parts of the motor. The extension is bifurcated at its upper end to provide clearance for the hub 30 whereby this hub is mounted intermediate the bearings of the substantial rock shaft 32.

Beyond one end of the boss the rock shaft 32 has keyed thereto a sector plate 34 (Figs. 5 and 8) so that the latter may be rocked back and forth in a direction paralleling the longitudinal axis of the casting, but at one side of the casting. Plate 34 adjacent its center is provided with an arcuate slot 35 into which projects a pin 36 driven into a suitable socket 37 in the boss 33. This pin serves as a positive stop to limit the rocking movement of the sector plate.

The lower edge of the sector plate is toothed as at 38 and in mesh with corresponding teeth 39 on a pinion 40, locked for rotation with wiper driving shaft 41. The casting is drilled completely through as indicated at 42 to provide a long substantial bearing for the shaft 41. That end of the shaft 41 which projects outwardly beyond the pinion 40 is greatly elongated and for purposes which will more fully hereinafter appear, is provided at one side with a flat 43, such flat permitting automatic locking of the pinion 40 against rotation with respect to the shaft 41. The opposite end of the shaft 41 which projects from the opposite side of the casting serves to actuate the snap valve mechanism which controls the exhaust of air and the admission of air to the working chambers. Such shaft end (Fig. 8) is provided with a pair of diametrically opposite flats 45 and with an axially threaded socket 46 to receive a screw 47. The flatting of the shaft end affords shoulders at 48 and the flattened end of the shaft together with the shoulders provides both a key and an abutment for the generally crescent shaped valve spring actuating member 49 shown in plan view in Fig. 11. Such plate at its center portion is provided with an opening 50 which fits over the shaft end 45 and abuts the shoulders 48.

Before describing the details of the snap valve action it may be noted that axial displacement of the shaft 41 is prevented by a pin 51 forced lightly through an opening 52 in the bottom of the casting A and into an annular groove 53 formed in the shaft 41.

Describing the valve mechanism with more particularity the valve spring actuating plate 49 includes a generally semi-circular outer edge 49b, the opening 50 being arranged approximately at the center of the semi-circle which would be defined by an imaginary line connecting the two ends of the edge 49b. In actual construction however, the member 49 at both ends of its semi-circular edge portion is cut back sharply as at 49c toward the center opening 50, the cut backs 49c affording shoulders which aid in defining the horns of the crescent. The upper contour of the plate then continues in the form of arcuate surfaces 49d, the strong curves of these arcs having as an approximate center the center of the opening 50. These arcuate surfaces are short and terminate abruptly in a second pair of shoulders 49e which cut back toward the ends of the opening 50, the periphery of the member 49 being completed by an upwardly curved section 49f connecting the inner ends of the shoulders 49e. There is thus afforded adequate metal about the opening 50 so that the member 49 is substantially devoid of weak bridging parts between the opening 50 and the outer edges of such member.

Before explaining the purpose of the two sets of shoulders 49c and 49e the remainder of the valve mechanism must be described. The purpose of the screw 47 is to hold in place a member 54 of circular contour and counter-sunk at 55 to receive the head of the screw. The inner end of this circular member includes a reduced portion 56 which bears against member 49 and retains the latter against displacement endwise of the shaft 41. The reduced portion 48 also serves as a hub upon which is swivelly mounted a loose spring anchoring member in the form of a disk 57, having a radially extending arm 58 bent angularly inwardly at 59 between the shoulders 49e and provided with an aperture 60 within which is anchored one end of a coiled contractile valve actuating spring 61. Member 57 is confined against endwise displacement on the member 54 by member 49 and by the shoulder of member 54 defined by the reduced portion 56 of the latter, yet is free to swivel on the reduced portion of member 54 between these confining elements. Assuming that no spring were anchored to the arm 58, the only movement which could be imparted to the member 57 by the rocking motion of shaft 41 would be by the shoulders 49e which, as the crescent shaped member 49 was rocked first in one direction and then the other, would alternately pick up and drop the arm 58 as the direction of oscillation of shaft 41 was reversed.

Encircling the end of the shaft 41 and reacting against plate 49 is a light coiled expansion spring 62, the function of which is to press a valve plate 63 against the flat circular face 64 afforded at one side of the casting. This valve plate 63 illustrated in detail in Figs. 9 and 10 is vertically elongated. Adjacent its lower end it is provided with an opening 63a adapted to fit over the circular end of the shaft 41. The body of the plate extends upwardly and at its top is bifurcated as indicated at 63b. Just above the opening 63a the material of the plate is pressed out to afford an arcuate recess 63c which constitutes a hood adapted to coact with a series of three ports consisting of a central port 65 arranged between a pair of other ports 66 opening upon the flat surface 64 of the casting. As the valve is rocked about its pivot the hood 63c serves to place the central port 65 in communication with one or the other of lateral ports 66. At the same time one or the other of a pair of bleeder holes 63d formed in slight lateral extensions 63e of the valve, register with the particular port 66 which is not communicating with the central port 65.

While the arrangement of ports and passageways in the casting will be described more fully hereinafter, it may be noted that the port 65 is in communication with a source of suction and that the ports 66 communicate through suitable passageways with the two working chambers. Thus as the valve 63 shifts from one position it serves to alternately permit the exhaust of air from one chamber and the bleeding of air through orifices 63d into the other chamber.

Inasmuch as it is far more practical to control the size of the openings 63d than to attempt to cast the ports 66 so that they are of very minute size, the average running speed of the motor may be determined in large measure by the bleeder holes 63d. By making these holes of very minute size the admission of air to the idle working chamber may be correspondingly retarded and the speed of the motor correspondingly reduced. It is worthy of note that this arrangement completely obviates the necessity for any restrictions in the suction line and permits the maximum power available to be utilized at all times.

The boss 33 is drilled through from side to side, providing a bore 67 within which a pin 68 is swivelled. One end of the pin is upset at 69 upon a washer 70 to prevent withdrawal of the pin in one direction, and the opposite end of the pin is upset as at 71 to hold a trip lever 72 in position. This lever is slipped over one end of the pin 68 against a flange 73, constituting an integral part of the pin 68 which flange serves as an abutment to limit the insertion of the pin 68 into its bore 67. The lower end of the trip lever 72 extends in a generally vertical direction and carries a stud 74 disposed between the furcation at the forked upper end of the valve plate. Above this stud, trip lever 72 is bent angularly outwardly as at 72a, terminating in a horizontally disposed portion 72b having a notch 72c therein into which is hooked the upper end of the spring 61. The stud 74 extends through the trip lever 72 and between the trip lever and the casting, carries a bumper member in the form of a rubber roller 75.

This roller as best seen in Figs. 2 and 3 is adapted to coact with a pair of oppositely inclined surfaces 76 formed as integral parts of the casting A. The bumper roller 75 (Fig. 1) may be held in place on the reduced rearwardly projecting end of the stud 74 by being forced over a knob 77 at the end of such reduced shaft portion.

The operation of the snap valve action is best illustrated in Figs. 2, 3 and 4. In Fig. 2 the right hand working chamber is in communication with a source of suction and the left hand is receiving air, the parts having reached a position where the valve is about to trip. During the power stroke of the right hand chamber which has nearly been completed, the spring actuating plate 49 has been rocking in a counter-clockwise direction and has, in its travel, picked up the arm 58 and carried it in counter-clockwise direction, causing it to tension the spring 61. In the absence of the shoulders 49c such counter-clockwise motion of the arm 58 could continue indefinitely without snapping the valve, due to the fact that the radial distance between opening 60 and the center of the shaft 41, is so predetermined that opening 60 can never travel to the left far enough to throw the spring 61 past center, the particular center referred to being the line drawn through the free end 72b of the trip lever and axis of the pin 68. However as the parts reach the position of Fig. 2 which is almost a dead center position with respect to the two spring anchorages and the pin 68, one horn of the crescent shaped member 49 defined by one of the shoulders 49c and the semi-circular edge of the member 49, has just made contact with the spring and upon further motion of member 49 in counter-clockwise direction, this horn of the crescent shaped spring actuating member will nudge the spring, giving it the slight impetus necessary to carry it past center and snap the entire valve mechanism to the position illustrated in Fig. 3. As the spring moves past center under the influence of the member 49, the trip lever 72 is swung sharply to the left to an extent limited by the engagement of the bumper roller 74 with the stop surface 76. During this fast spring impelled movement of the trip lever, stud 74 will snap the valve plate from the position of Fig. 2 to the position of Fig. 3, thus reversing the porting arrangement, placing the left hand working chamber (Fig. 2) in communication with a source of suction and placing the right hand working chamber in communication with the atmosphere through one of the bleeder holes.

With the parts in the position of Fig. 3, the spring 61 has a tendency to move the arm 58 in a clockwise direction and as the spring actuating plate 49 starts rocking in a clockwise direction, arm 58 will be moved for a short distance by the spring until such time as it lies straight between the two centers constituted by the axis of shaft 41 and the horizontal portion of the free end of the trip lever 72. Then temporarily as the collapsing of the left hand working chamber continues, the arm 58 will remain stationary, the right hand shoulder 49e of the member 49 will leave the arm 58 and no further motion of the arm and no further tensioning of the spring will occur until the left hand shoulder 49e (Fig. 11) again takes up the arm 58 and carries it toward the right whereupon a reverse valve operation eventually occurs. That is to say, the parts will reach a position where the spring is fully tensioned and the left hand horn of the crescent moves the spring past the center to the right and snaps the valve back into position (Fig. 2).

Referring again to the working chambers, I prefer to employ within these chambers, a mechanism calculated not only to insure uniform flexing of the relatively light rubber bags on the suction impelled power stroke, but designed to prevent any frictional contact between the inwardly flexed bags and any stationary member such for instance as the walls of the recesses 11. Such friction occurring under heavy load is apt to result in the delivery of less power or to render the action of the motor uncertain, unless means is provided to guard against it.

Referring back to the working chambers, I have previously described the manner in which the sleeve 22 is force-fitted over the flanged plate 20 leaving the upwardly projecting flanges 23. Sleeve 22 near its lower edge is provided with diametrically opposite outwardly pressed portions 79 which are accommodated in slots 80 arranged at diametrically opposite portions of an outer auxiliary sleeve member 81. Slots 80 extend from the bottom of sleeve 81 to a point slightly above the center of the latter and at their lower ends these slots are provided with flaring mouths 82 for a purpose which will more fully hereinafter appear. Sleeve 81 is somewhat longer than sleeve 22 and its outside diameter is slightly less than the inside diameter of the recesses 11 to the end that sleeve 81 will have no substantial frictional contact with the stationary wall of the working chamber but will allow for free passage of air between such wall and the sleeve.

As best seen by observing the left hand working chamber of Fig. 2, the lower end of the sleeve 81 is well within the stationary part of the working chamber even when the rubber cup is fully elevated. Observing the right-hand working chamber of Fig. 2 which shows the rubber cup almost in its lowermost position, it will be noted that sleeve 81 never touches the bottom of the working chamber.

In operation, assuming that a working chamber is fully expanded, the first action of the sub-atmospheric pressure caused by connecting such chamber to a source of suction, will be to draw the lateral walls of the rubber bag inwardly against sleeve 81 thereby circumferentially engaging the sleeve and permitting the inner sleeve 22 to move downwardly through it. Continued downward movement of the sleeve 22 through the sleeve 81 is accompanied by a rolling flexure of the bag above the flange 23. As this flange moves downwardly far enough to clear the top of the inside of the sleeve 81, sub-atmospheric pressures will tend to draw the inwardly folded rubber cup against the inside of the sleeve 81. The arched effect of the rubber above the upper edge of the sleeve 81 is sufficient at all times to prevent rubber to rubber contact at this point, but in the absence of the sleeve 81 or some equivalent mechanism the rubber bag would be drawn against the inner stationary wall of the socket 11 as the bag passes within the mouth of the recess 11. Obviously this would create an undesirable friction between the rubber bag and the stationary chamber wall, such friction being overcome only by the use of power which would otherwise be delivered at the wiper operating shaft.

To more fully explain this operation it should be noted that when the motor is loaded, the floating sleeve is never moved downwardly by the pressure of the rubber on the top end thereof. It should also be noted that under these conditions the outwardly acting frictional grip of the inwardly folded cup 14 on the inside of this sleeve does not have to combat the inward acting friction of the outer portion of the cup, due to the fact that the self-sustaining arch is moving further and further down as the cup folds inwardly, and by the time the outer sleeve 81 is gripped internally by the inwardly folded rubber, the arch will have descended to such a point that the pressure of the rubber against the outside of the cup is substantially released. It is difficult to determine exactly what does occur during the suction impelled power stroke of the motor and the foregoing explanation of the action of the rubber cup on the floating sleeve is merely offered tentatively and I do not wish to be bound by it. Actual tests have demonstrated however that the presence of this supplemental floating sleeve entirely avoids friction and irregularities of action which occur without it.

After the power stroke of the working chamber has been completed and air is again admitted on the idle stroke, the rubber will of course release the floating sleeve and the latter will merely be picked up by the engagement of sleeve projections 79 in the slot 80.

This is also due to the fact that the rubber bags themselves are normally of less diameter than the collars over which they are applied so that there will always be some tendency of the rubber at all times to grip that portion of the outer sleeve with which it is in contact. This gripping effect is of course at its minimum at that period when the bag is folded so far inwardly that an arching effect tends to relieve the normal contracting tendency of the rubber bag at its region of contact with the outer cup.

The valve mechanism and the two working chambers are preferably concealed from view and in large measure protected from dust and moisture by the provision of a dust cap 85 constructed to fit over the upper portion of the motor with reasonable snugness and to rest upon a flange 86 of proper contour formed integrally with the casting. It will be understood that the dust cap affords sufficient clearance so that the rubber bags never rub against it; also so that this cap may be secured by any suitable means as by the use of a screw working through the cap and screwing into a threaded socket 87 in a small boss 88 rising from the central vertical enlargement or boss 33 of the casting (Fig. 8).

Opening upon a flat face 90 on the under side of the casting (Fig. 19) are a pair of ports 91 and 92. Port 91 is connected through passages which will be later described, to the source of suction and the port 92 is connected through other passageways which will be later described, to the suction port 65 controlled by the snap valve action above described.

A main control and parking valve member 93 (Figs. 13 and 15) is slidable over the flat bottom surface 90 of the casting and shiftable from the position where it places the ports 91 and 92 in communication through the recess 94 formed in the base of the valve to a position where communication between the main suction line and the snap valve action is cut off. Ignoring for a moment the manner in which this valve coacts with the wiper arm parking mechanism, its function as a control valve is as follows. A lever 95

(Figs. 6, 7, 14 and 15) is pivoted intermediate its ends upon a stud 96 projecting from the under face of the base plate. One arm of this lever is provided with an opening 97 therein of proper size and shape to receive the projection 98 below the hood portion 94 of the control valve 93. The other arm of the lever terminates in an upwardly directed hooked extension 99 engaging an opening 100 in a slide member 101, the latter being guided for transverse sliding movement across the bottom of the casting between a pair of guide rails 102 integral with the casting. A control handle 103 detachably securable to either end of the slide 101 may be manually pushed or pulled to shift the slide inwardly or outwardly and thereby shift the control member from its open to its closed position. A leaf spring 104 has its free end bearing upon the control valve to hold the latter on its seat.

The function which the lever 95 has in parking the wiper arm which may be carried by the shaft 41 is as follows. That portion of the lever opposite the hooked end 99 and beyond the valve 93 carries a roller 105 which as the lever 95 is rocked about, its pivot is shiftable into or out of non-positive interlocking relationship with a notch 106 in the pinion 40. A cam nose 107 arranged on the lever 95 adjacent the roller 105 is in contact with a bowed spring 108, the latter having a bent end 109 anchored in a slot 110 in a boss 111 on the underface of the casting. Figs. 6 and 7 show the cam nose 107 at opposite sides of the dead center position with respect to the spring 108. With the parts in the position of Fig. 7, the tendency of the spring 108 is to hold the roller carrying end of the lever 95 against movement toward the pinion 40. When the handle 103 however has been shifted from the position of Fig. 7 to that of Fig. 6, the spring has a reverse action and tends to press the roller 105 against the face of the pinion 40, finally forcing the roller into the notch 106 as the rocking action of the pinion brings the notch into registration with the roller.

In conjunction with this action it should be noted that the handle 103 may be thrust inwardly at any time during the running of the motor and regardless of the position of the wiper blade on the glass. When so thrust in it shifts the lever 95 past the dead center of the spring 108 and causes contact of the roller 105 with the pinion 40. Assuming however that the notch 106 is at this time out of registry with the roller, the motor will continue to run until such time as the notch registers with the roller. This is due to the fact that the communication between the ports 91 and 92 cannot be completely cut off until the roller snaps to its final position within the notch.

When I say pushing or pulling the handle 103, such terms are entirely relative since the purpose of having the handle 103 detachably engageable with either end of the slide is to permit the motor to be mounted either outside or inside of the windshield of a car so that without any change in the internal mechanism an operating handle for the control or parking valve is readily accessible. Preferably each motor is sold with a pair of handles, a relatively short one for controlling the supply of motive fluid to a motor mounted within the car and a much longer one for controlling the supply of motive fluid for a motor mounted outside of the car.

All of these movable parts arranged beneath the motor casting are preferably concealed by a dust cover 112, the latter being retained in position by screws 113. One of these screws shown in Fig. 8, works into a threaded socket 114 in the boss 111 and the other screw (not shown) works into a correspondingly threaded socket 115 in the stud 96. The slide member 101 is preferably sustained in the position shown in Fig. 12 by a coiled expansion spring 116 encircling a stud 117 which passes through an opening 118 in the slide member and predetermines a the limits of the movement of the slide. Similarly a coiled expansion spring 119 encircles the pivot stud 96 of the lever 95 and presses this lever upwardly as shown in Fig. 14.

It will be observed that the threaded reduced ends of the handle member 103 or its companion handle member (not shown) are each provided with reduced threaded ends which screw into threaded openings 120 arranged in ears 121 pendant from the opposite ends of the slide 101. Inasmuch as only one handle will be in use and two openings 122 must be provided in the flange of the dust cover 112 for the optional use of either handle, I preferably associate with these openings, swinging closure plates 123 pivoted as at 124 to the flanges of the dust covers so that the opening not in use may be closed and dust excluded.

Figs. 17 to 25 are intended primarily to illustrate in detail the arrangement of the various ports and passageways in the casting. They incidentally serve however, to illustrate how this casting has been laid out to utilize a minimum amount of metal while avoiding dangerously thin walls at any points. Adapted for connection to a suction tube leading to the intake manifold or to any other suitable source of suction, is a short conduit 125 drive-fitted into an upwardly facing short bore 126 formed at one corner of the casting. The bore 126 (Fig. 20) is intersected by a transverse bore 127 extending longitudinally of the casting and having its outer end closed by a plug 128. Bore 127 communicates with a short transverse bore 128' having its outer end closed by plug 129 and bore 128' in turn is intersected by a port-forming bore 91.

The port 92 constitutes one end of an inwardly and upwardly extending diagonal bore 130 which intersects a bore 131 extending from side to side of the casting through the boss 33 slightly above the bearing bore 42 for the shaft 41. One end of the bore 131 is closed by a plug 133 and the opposite reduced end 134 of the bore 131 opens into the face of the flat casting surface over which the snap valve 63 travels and terminates at the port 65.

Ports 66 constitute the ends of downwardly and inwardly extending passageways 135 terminating at the lower ends of the recesses 11. As best illustrated in Figs. 18 and 23, the bores 135 open into the lower ends of vertical grooves 136 formed in the walls of the cylinders 11 and designed to insure free flow of air from the top to the bottom of the chamber even though the floating sleeves, due to abnormal conditions, drop onto the bottom of the recesses 11.

The operation of the motor will be self-evident from the foregoing description since the operation of all the individual elements themselves have been described. Obviously such a motor while particularly intended for light duty and for driving a windshield wiper, embodies many principles capable of utility with or without minor modifications in a heavy duty motor structure, and insofar as the motor itself is concerned it may be put to various uses. Insofar as the particular type of wiper driven by this motor is concerned, it will be self-evident that it might serve as the power plant for any standard windshield wiper mechanism.

In order to avoid the use of shaft extensions etc. to accommodate different types of mounts, the extended end of the shaft 41 is preferably made quite long and is provided with any suitable number of guide grooves 137 to guide the accessory dealer in cutting the shaft off to the length required for any special mounting.

My present invention does not concern itself with any special method of mounting the motor. I have illustratively shown a pair of threaded openings 138 arranged in ears 139 integral with opposite ends of the casting member A and adapted to receive any suitable form of mounting screw or adaptor fixture. In a separate application Serial No. 385,828, filed August 14, 1929 I have described and claimed a set of universal adaptor fixtures by which the motor herein illustrated may be conveniently and expeditiously mounted on any standard make of car.

From the foregoing description of the motor it will be apparent that it is particularly compact and that compactness is effected in all dimensions. Certain typical illustrations of the means by which compactness has been effected may be worth special attention.

The expedient of attaching the links to the thimbles well below the top surface of the rubber cups saves an appreciable amount of height. Making the center boss 33 as narrow as possible and utilizing substantially all of the available space between such boss and the ends of the casting for the working chamber units, reduces the length of the device materially. To maintain the width of the motor at a minimum the valve mechanism is so arranged that it works closely against the side face of the casting as do the sector and pinion at the opposite side of the boss. The parking and control mechanism are mounted as close as is practicable against the underface of the casting so that but a shallow dust cover is required and the overall height of the motor further minimized. The top dust cover, as will be evident from the drawings, is so designed that it but negligibly increases the height of the motor and does not increase its width or length at all.

Having thus described my invention, what I claim as new and desire to secure by Letters Patent is:—

1. In a light duty suction motor, a casting, a boss rising from the center of the casting, a walking beam pivoted in the boss, a rock shaft journalled in the boss and extending therethrough at right angles to and below the walking beam, means coacting with each end of the casting to afford a collapsible wall working chamber, means connecting the collapsible walls of said chambers with the ends of the walking beam, means for translating oscillation of the walking beam into oscillatory motion of the shaft, a valve action controlled from the shaft and controlling the admission and exhaust of air to the chambers, a second valve controlling the supply of motive fluid to the first valve.

2. In a light duty suction motor, a casting, a boss rising from the center of the casting, a walking beam pivoted in the boss, a rock shaft journalled in the boss and extending therethrough at right angles to and below the walking beam, means coacting with each end of the casting to afford a collapsible wall working chamber, means connecting the collapsible walls of said chambers with the ends of the walking beam, means for translating oscillation of the walking beam into oscillatory motion of the shaft, a valve action controlled from the shaft and controlling the admission and exhaust of air to the chambers, a second valve arranged under the casting and controlling the supply of motive fluid to the first valve, actuating means for the second valve and means controlled by said actuating means and engageable with a part of the motion translating train for automatically interlocking with said motion translating train when the shaft has been rotated to a predetermined position for locking said shaft against further rotation, at the same time that the second valve is fully closed.

3. In a windshield wiper, a suction operated motor and a shaft driven from the motor and adapted to actuate a windshield wiper, means driven from the motor and driving said shaft, means for connecting the motor to a source of suction, a valve controlling said connection, means mechanically inter-engageable with the shaft driving mechanism to restrain the shaft against movement, means permitting manual initiations of the closing movement of the valve and means automatically acting to completely close the valve and simultaneously engage said locking means when the driving means for the shaft reaches a predetermined position.

4. The combination with a suction motor, and an oscillatory shaft adapted for taking off power from the motor and adapted to mount a windshield wiper, of a parking and control valve arranged in the main motive fluid supply line, driving connections interposed between the shaft and the motor, a parking device mechanically engageable with said driving connections and operable simultaneously with said valve means to prevent closing of said valve except simultaneously with movement of said parking device into parking position.

5. The combination with a suction motor, an oscillatory shaft adapted for taking off power from the motor and adapted to mount a windshield wiper of a parking and control valve arranged in the main motive fluid supply line, driving connections interposed between the shaft and the motor, a parking device mechanically engageable with said driving connections and operable simultaneously with said valve means to prevent closing of said valve except simultaneously with movement of said parking device into parking position, and spring means operative when the motor is running to hold the valve open and the parking device inoperative, an actuating handle for said valve, said spring means acting when said handle is shifted to close the valve to complete said shifting action, and shift said parking device into locking position as soon as the wiper reaches a predetermined point against travel.

6. In a suction operated windshield wiper, a wiper actuating shaft, a gear train for driving said shaft, a mechanical parking device engageable with said gear train when the wiper is in one position only, a valve controlling a supply of motive fluid and interlocked with said parking device.

7. In a suction operated windshield wiper, a wiper actuating shaft, a gear train for driving said shaft, a mechanical parking device engageable with said gear train when the wiper is in one position only, a valve controlling a supply of motive fluid and interlocked with said parking device, a past center spring normally holding the valve open and the parking device inoperative and acting when the valve has been moved toward closed position to complete simultaneous closing of the valve and engage the parking device when the shaft reaches its predetermined parking position.

8. In a windshield wiper, a suction motor, an oscillating shaft, driving connections between the motor and the shaft, a snap over valve controlling the communication of the motor with the suction line, a main control valve for cutting off the suction line in advance of the snap valve, a mechanical parking device operable in synchronism with the main control valve and mechanically engageable with the shaft operating mechanism, the working parts of said motor having no communication with said source of suction except through said snap valve.

9. A suction motor including a casting, a pair of working chambers arranged above the casting, a snap over valve mechanism arranged at the side of the casting controlling the flow of motive fluid to the chambers, a main control valve arranged on the bottom of the casting and controlling the flow of motive fluid to the snap over valve, means mechanically engageable with a moving part of the motor to restrain the motor against movement, said means operating in synchronism with the control valve.

10. In a light duty suction motor a collapsible wall working chamber having a port therein through which air is alternately admitted and exhausted, said chamber including a cylindrical stationary portion and an inverted rubber bag projecting well beyond the mouth of said stationary portion and constituting the movable chamber wall, a pair of telescoping sleeve members arranged one within the other within said chamber but out of contact with the stationary walls thereof, means to connect the inner of said sleeve members with the center of the movable wall and means to engage and hold the outer sleeve member in a predetermined position when the bag is fully distended.

11. In a light duty suction motor a collapsible wall working chamber having a port therein through which air is alternately admitted and exhausted, said chamber including a cylindrical stationary portion and an inverted rubber bag projecting well beyond the mouth of said stationary portion and constituting the movable chamber wall, a pair of telescoping sleeve members arranged one within the other within said chamber but out of contact with the stationary walls thereof, means to connect the inner of said sleeve members with the center of the movable wall and means carried by said inner sleeve member to engage and hold the outer sleeve member in a predetermined position when the bag is fully distended, said outer sleeve member in its most elevated position extending within the stationary portion of the working chamber.

12. In a light duty suction motor a collapsible wall working chamber having a port therein through which air is alternately admitted and exhausted, said chamber including a cylindrical stationary portion and an inverted rubber bag projecting well beyond the mouth of said stationary portion and constituting the movable chamber wall, a pair of telescoping sleeve members arranged one within the other with said chamber, means to connect the inner of said sleeve members with the center of the movable wall and means to engage and hold the outer sleeve member in a predetermined position when the bag is fully distended, said outer sleeve member in its most elevated position extending within the stationary portion of the working chamber, said inner sleeve member being movable freely downwardly with the initiation of the suction impelled collapsing movement of the bag, while the outer sleeve is temporarily sustained by the inwardly acting pressure on the sides of the bag.

13. A working chamber for a suction motor including a stationary cylindrical portion and a partially evertible diaphragm coacting therewith and constituting a movable wall, said chamber having a port therein through which air is alternately exhausted and admitted, means for attaching the center of the diaphragm to a power take off member including a pair of telescopically interfitting flanged thimbles passed through a central opening in the diaphragm and clamping the material around said opening between the flanges thereof and a cross member carried by the inner thimble for engagement with a power take off device.

14. A working chamber for a suction motor including a stationary cylindrical portion and a partially evertible diaphragm coacting therewith and constituting a movable wall, said chamber having a port therein through which air is alternately exhausted and admitted, means for attaching the center of the diaphragm to a power take off member including a pair of telescopically interfitting flanged thimbles passed through a central opening in the diaphragm and clamping the material around said opening between the flanges thereof, and a washer member also clamped between the flanges of the thimbles to preclude leakage of air through the diaphragm.

15. A snap valve action for suction motors of the type which present a flat surface having three ports therein, the central one of which communicates with a source of suction and the side ones of which communicate with the spaces from which air is to be exhausted and admitted, said valve mechanism including a pivoted valve plate having a hood portion adapted to place either of said side ports in communication with the central port, a trip lever pivoted above the valve plate pivot and including a portion to engage and actuate the valve, a loosely swivelled spring tensioning device pivoted on the same center as the valve, a coiled contractile spring connecting said tensioning device with the trip lever, positively driven means for actuating the tensioning device to tension the spring and for engaging the tension spring to trip the valve.

16. A snap valve action for suction motors of the type which present a flat surface having three ports therein, the central one of which communicates with a source of suction and the side ones of which communicate with the spaces from which air is to be exhausted, said valve mechanism including a pivoted valve plate having a hood portion adapted to place either of said side ports in communication with the central port, a trip lever pivoted above the valve plate pivot and including a portion to engage and actuate the valve, a loosely swivelled spring tensioning device pivoted on the same center as the valve, a coiled contractile spring connecting said tensioning device with the trip lever, positively driven means for actuating the tensioning device to tension the spring and for engaging the tension spring to trip the valve, said tensioning device including a radial arm affording a spring anchorage so close to the center of the tensioning device that the tensioning device is itself unable to move the spring past center and cause snapping of the valve.

17. A snap valve action for suction motors of the type which present a flat surface having three ports therein, the central one of which communicates with a source of suction and the side ones of which communicate with the spaces from which air is to be exhausted, said valve mechanism including a pivoted valve plate having a hood portion adapted to place either of said side ports in communication with the central port, a trip lever pivoted above the valve plate pivot and including a portion to engage and actuate the valve, a loosely swivelled spring tensioning device pivoted on the same center as the valve, a coiled contractile spring connecting said tensioning device with the trip lever, positively driven means for actuating the tensioning device to tension the spring and for engaging the tension spring to trip the valve, said last mentioned means comprising a rocking element having portions to engage and actuate the tensioning device and other portions to engage and move the spring.

18. A snap valve mechanism for suction motors of the type which present a flat surface having three ports therein, the central one of which communicates with a source of suction and the side ones of which communicate with the spaces from which air is to be exhausted, said snap valve mechanism including a pivoted valve plate having a hood portion adapted to place either of said side ports in communication with the central port, a trip lever pivoted above the valve plate pivot and including a portion to engage and actuate the valve, a loosely swivelled spring tensioning device pivoted on the same center as the valve, a coiled contractile spring connecting said tensioning device with the trip lever, positively driven means for actuating the tensioning device to tension the spring and for engaging the tension spring to trip the valve, said last mentioned means including a generally crescent-shaped member fixed to rock on the pivotal center of the valve, the horns of the crescent being engageable with the spring to actuate the same and the crescent intermediate said horns including parts engageable with the tensioning device.

19. A valve action as set forth in claim 15 wherein stop members are provided to limit the movement of the valve and a bumper carried by the trip lever coacts with said stop members.

20. Parking and suction cut-off mechanism for a suction motor of the character which presents a flat surface having a pair of ports therein and a hood valve movable over the ports to establish connection of the motor with the suction line, said mechanism including a lever pivoted intermediate its ends and actuating said valve, a member at one end of the lever adapted to mechanically interlock with a moving part of the motor when the valve is in position to cut off the suction and manually operable means engaged with the opposite end of the lever for rocking the latter about its pivot.

21. Parking and suction cut-off mechanism for a suction motor of the character which presents a flat surface having a pair of ports therein and a hood valve movable over the ports to establish connection of the motor with the suction line, said mechanism including a lever pivoted intermediate its ends and actuating said valve, a member at one end of the lever adapted to mechanically interlock with a moving part of the motor when the valve is in position to cut off the suction and manually operable means engaged with the opposite end of the lever for rocking the latter about its pivot, said means including a slide member and an operating handle therefor.

22. Parking and suction cut-off mechanism for a suction motor of the character which presents a flat surface having a pair of ports therein and a hood valve movable over the ports to establish connection of the motor with the suction line, said mechanism including a lever pivoted intermediate its ends and actuating said valve, a member at one end of the lever adapted to mechanically interlock with a moving part of the motor when the valve is in position to cut off the suction and manually operable means engaged with the opposite end of the lever for rocking the latter about its pivot, a past center spring operatively engaged with the lever and acting either to hold the parking device inoperative or to urge it toward parking position in accordance with the setting of the manually operable lever rocking device.

23. Parking and suction cut-off mechanism for a suction motor of the character which presents a flat surface having a pair of ports therein and a hood valve movable over the ports to establish connection of the motor with the suction line, said mechanism including a lever pivoted intermediate its ends and actuating said valve, a member at one end of the lever adapted to mechanically interlock with a moving part of the motor when the valve is in position to cut off the suction and manually operable means engaged with the opposite end of the lever for rocking the latter about its pivot, a past center spring operatively engaged with the lever and acting either to hold the parking device inoperative or to urge it toward parking position in accordance with the setting of the manually operable lever rocking device, said parking device being engageable with the moving part of the motor only when such part is in a predetermined position and means to prevent complete closing of the valve prior to the time that the parking device is thrust into locking position by the past center spring.

DAVID KUSKIN.